(12) United States Patent
Gerber et al.

(10) Patent No.: US 11,357,176 B1
(45) Date of Patent: Jun. 14, 2022

(54) TREE SUPPORT WITH ARTICULATING LEG

(71) Applicants: Lloyd Gerber, Davie, FL (US);
Thomas Pascuzzo, Coconut Creek, FL (US); Farrell Gerber, Davie, FL (US)

(72) Inventors: Lloyd Gerber, Davie, FL (US);
Thomas Pascuzzo, Coconut Creek, FL (US); Farrell Gerber, Davie, FL (US)

(73) Assignee: TREE HUGGER SOLUTIONS, LLC, Lake Worth, FL (US)

( * ) Notice: Subject to any disclaimer, the term of this patent is extended or adjusted under 35 U.S.C. 154(b) by 427 days.

(21) Appl. No.: 16/685,108

(22) Filed: Nov. 15, 2019

Related U.S. Application Data

(60) Provisional application No. 62/768,619, filed on Nov. 16, 2018.

(51) Int. Cl.
*A01G 17/14* (2006.01)

(52) U.S. Cl.
CPC .................... *A01G 17/14* (2013.01)

(58) Field of Classification Search
CPC ........ A01G 17/14; A01G 17/06; A01G 17/12; A01G 17/04
See application file for complete search history.

(56) References Cited

U.S. PATENT DOCUMENTS

| | | | |
|---|---|---|---|
| 1,952,655 A | 3/1910 | Wagner | |
| 5,402,600 A | 4/1995 | Tompkins | |
| 5,465,529 A | 11/1995 | Park | |
| 6,370,817 B1 * | 4/2002 | Brooks | ................ A01G 17/04 24/19 |
| 6,612,071 B1 | 9/2003 | Steadman | |
| 8,407,934 B1 | 4/2013 | Solares | |
| 10,206,337 B1 * | 2/2019 | Pascuzzo | ............... A01G 17/14 |
| 2005/0108934 A1 * | 5/2005 | Goltz | ..................... A01G 17/04 47/43 |
| 2006/0207169 A1 * | 9/2006 | Goltz | ..................... A47G 33/12 47/43 |
| 2007/0084137 A1 | 4/2007 | Pasto | |
| 2009/0119984 A1 | 5/2009 | Nabhan | |

* cited by examiner

*Primary Examiner* — Kristen C Hayes
(74) *Attorney, Agent, or Firm* — Mark D. Bowen, Esq.; Malin Haley DiMaggio & Bowen, P.A.

(57) ABSTRACT

A tree support block that is easy to install and remove, for temporarily supporting a tree and does not impart damage to the tree. A plurality of one-piece molded support blocks which are designed to be strapped to the trunk of a tree encircling the trunk. A pivotal leg adapter allows for angularly adjustable positioning of each support leg thereby maximizing support configurations. Support stress is transferred from the adapter to the support base such that the entire support force is not borne concentrated at the pivot connection.

6 Claims, 7 Drawing Sheets

TREE SUPPORT WITH ARTICULATING LEG

CROSS REFERENCE TO RELATED APPLICATIONS

This application claims the benefit of provisional U.S. Patent Application Ser. No. 62/768,619, filed on Nov. 16, 2018.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to tree planting apparatus, and more particularly to a support apparatus for supporting newly planted trees and the like.

2. Description of Related Art

Support systems are often employed to provide temporary support for newly planted trees. Such systems typically include a number of support blocks secured around the trunk of the tree by straps, and legs or posts (e.g. 2×4 or 4×4) connected to the blocks and extending downward at a predetermined angle to the ground. Basic tree support systems use simple blocks of wood strapped around the tree with 2×4 posts nailed to the blocks. The installation of basic tree support systems is known to be time consuming and often resulting in improper installation that renders the system ineffective and/or likely to damage the supported tree. In addition, workers often install the support systems with the legs installed at improper angles thereby limiting the ability of the support systems to adequately withstand stresses experienced in high wind conditions.

The background art reveals a number of systems have been developed to advance the art of tree support systems. Typical of such systems is U.S. Pat. No. 8,407,934, issued to Solares, which discloses a tree planting support system including a housing assembly, band clamps, and a stake assembly. The housing includes a fixed angled cavity for receiving the end of a support post therein. The housing mounts onto a tree trunk to stabilize a recently planted tree in a substantially vertical position until its root system can take hold.

Typical tree support systems, such as the one disclosed by Solares, are burdened by significant limitations and disadvantages that have prevented widespread commercial acceptance and use. Accordingly, there exists a need for further advancements in the art of support systems for newly planted trees.

BRIEF SUMMARY OF THE INVENTION

The present invention overcomes the limitations and disadvantages present in the art by providing an improved tree support system and method for temporarily supporting a tree that is easy to install and remove and does not impart damage to the tree. A primary aspect of the present invention involves providing a plurality of molded support blocks, each of which includes a base and a leg-receiving adapter. A plurality of support blocks which are designed to be strapped to the trunk of a tree such that a suitable number said blocks encircle the trunk. Each support block may further be adapted to include a flexible backing to protect the tree. The flexible backing may be factory installed, or in the alternative shipped with each block and user installed as may be desired. One or more strap-receiving loops is disposed on the block for receiving securing straps. The block includes a curved surface to prevent the securing straps from forming sharp bends which can lead to stress concentration-related strap failure.

A significant aspect of the present invention involves providing a support block having a a pivotally attached leg-receiving adapter. The adapter preferably defines a generally rectangular cross-section sized for receiving a wooden support leg, such as a 2×4. By providing a pivotal leg adapter, the present invention provides for angularly adjustable positioning of each support leg thereby maximizing support configurations. A further significant aspect of the present invention involves providing structure wherein leg support stress is transferred from the adapter to the support base such that the entire support force is not borne concentrated at the pivot connection. Accordingly, the support block base and adapter are formed with corresponding mating concave and convex load-bearing surfaces which cooperate to apply support stress evenly to the support block structure.

In an alternate configuration, each block may include an angled cavity having a generally rectangular cross-section sized for receiving a wooden support post or leg, such as a 2×4, thereby ensuring proper angled positioning of the support posts. The support blocks may be injection molded from a suitable injection molding material, and may further be colored for safety, such as safety orange or yellow to provide high visibility.

Accordingly, it is an object of the present invention to provide advancements in the art of tree support devices.

It is another object of the present invention to provide a tree support system that is quickly and easily installed thereby resulting in efficient planting operations.

Yet another object of the present invention is to provide a tree support system that avoids ineffective installation by providing angularly adjustable support legs to ensure that the tree support legs are installed at an optimum angle.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

In describing this invention, the word "coupled" is used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another. By adjacent to a structure is meant that the location is near the identified structure.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
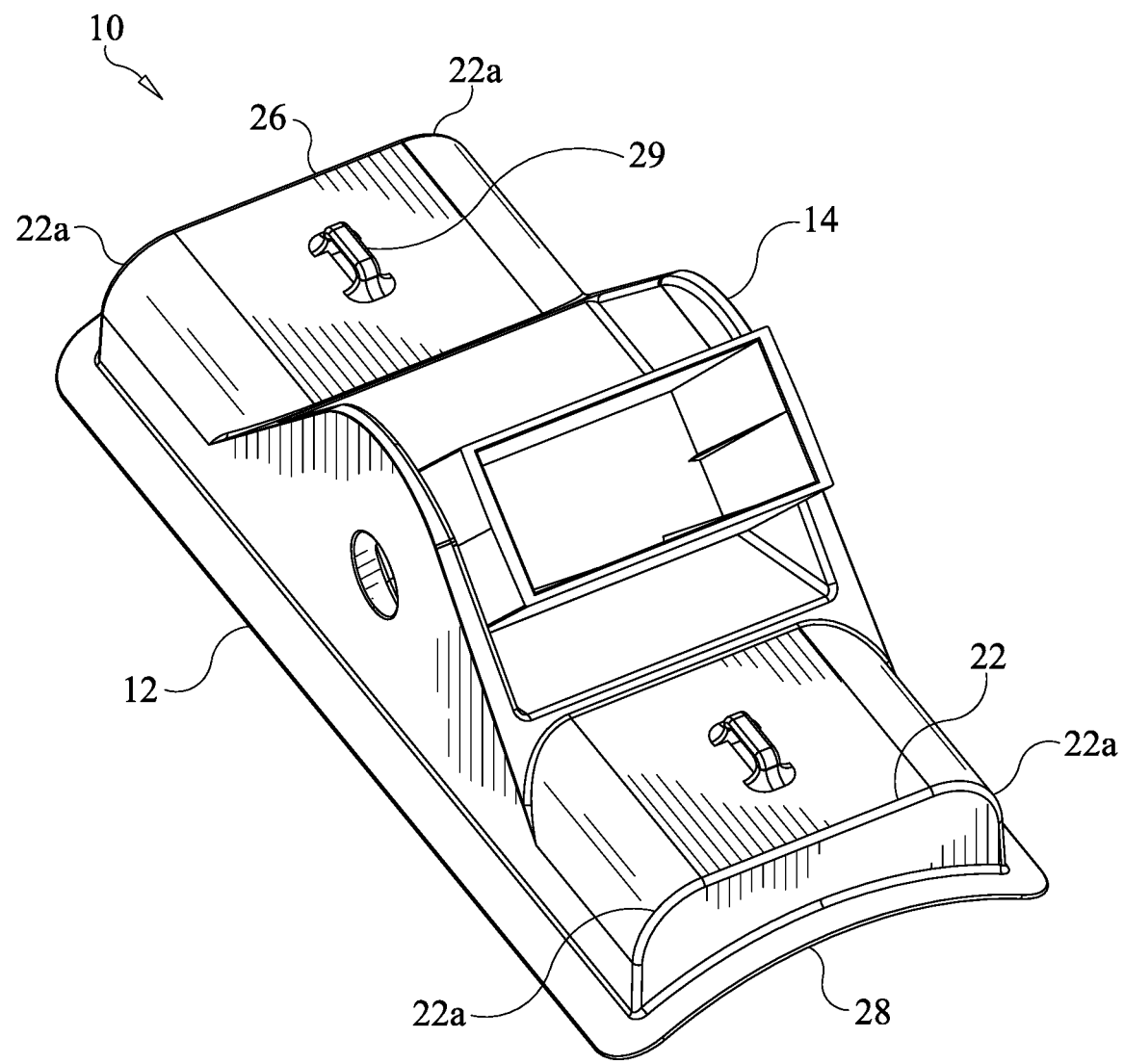
FIG. 1 is a front perspective view of a tree support block having an articulating support leg-receiving adapter in accordance with the present invention.
Figure 2:
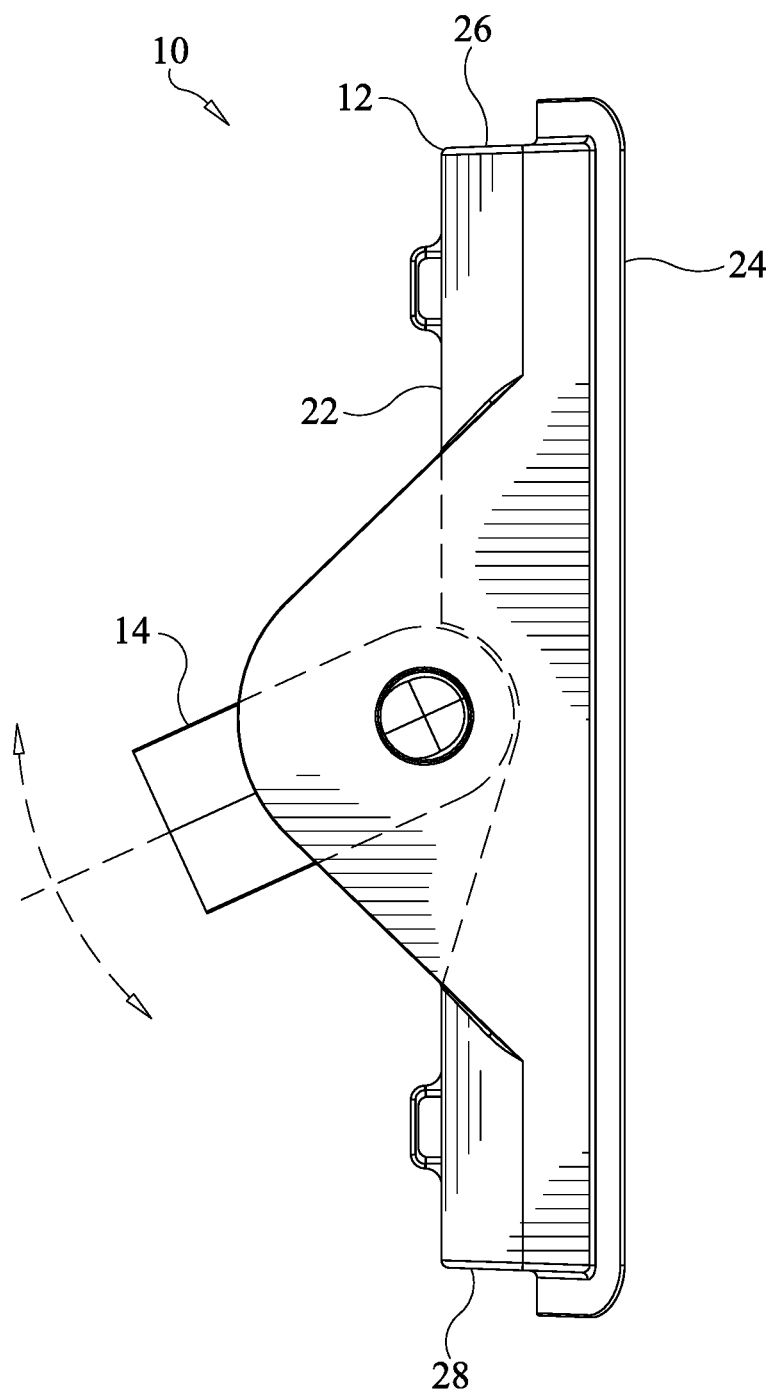
FIG. 2 is a side view thereof.
Figure 3:
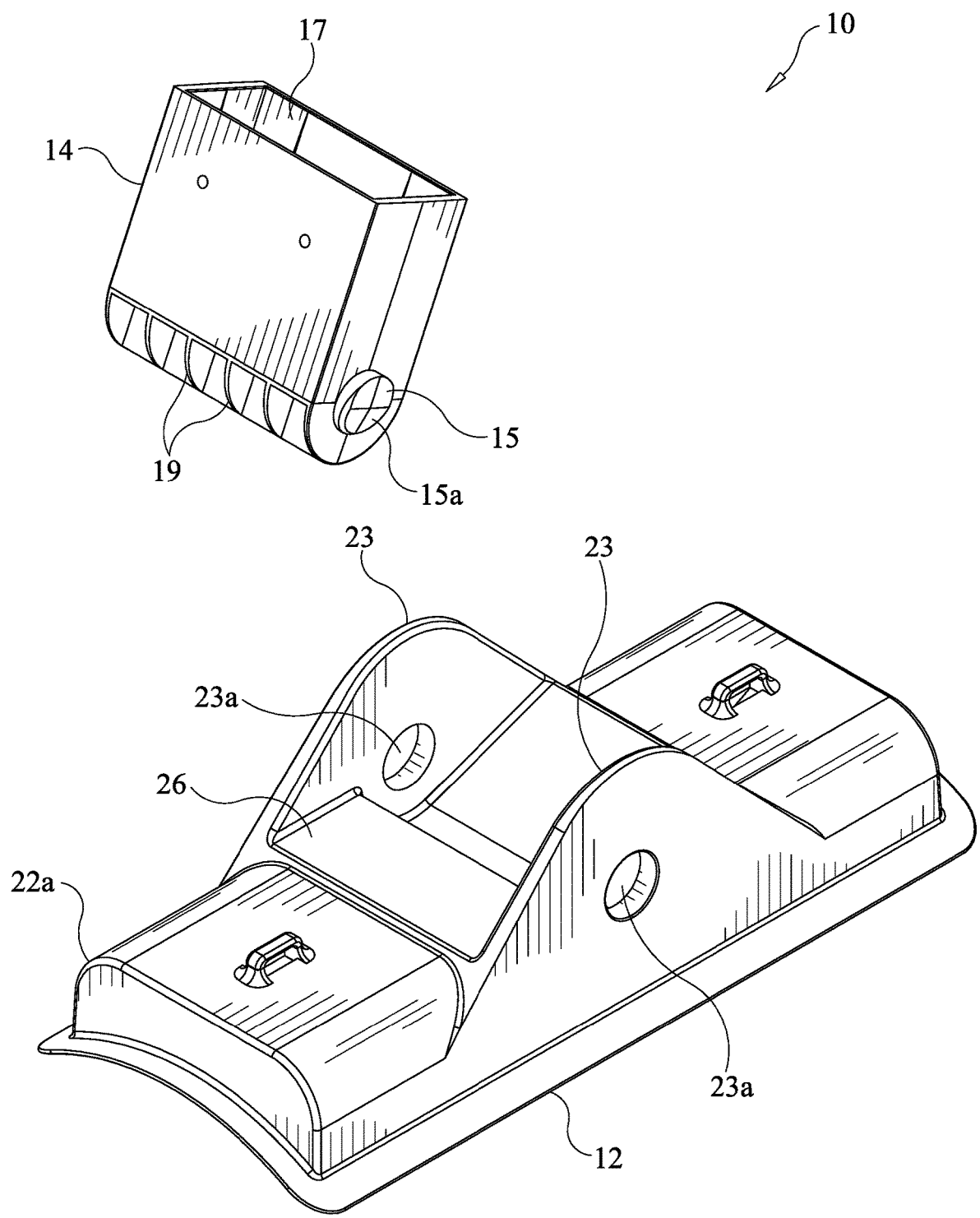
FIG. 3 is an exploded view.
Figure 4:
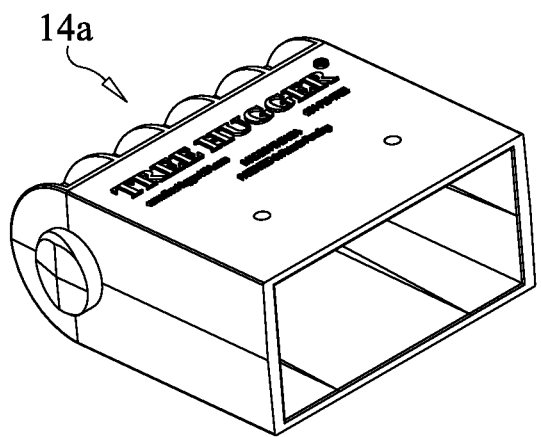
FIG. 4 depicts a plurality of support leg-receiving adapters configured for different support leg sizes.
Figure 4:
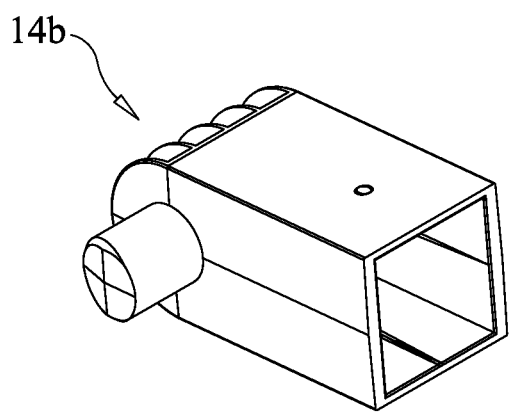
Figure 4:
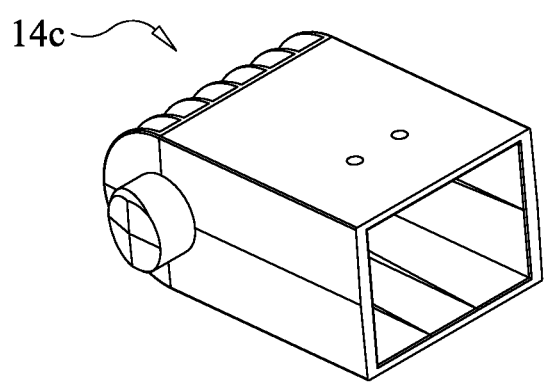
Figure 5:
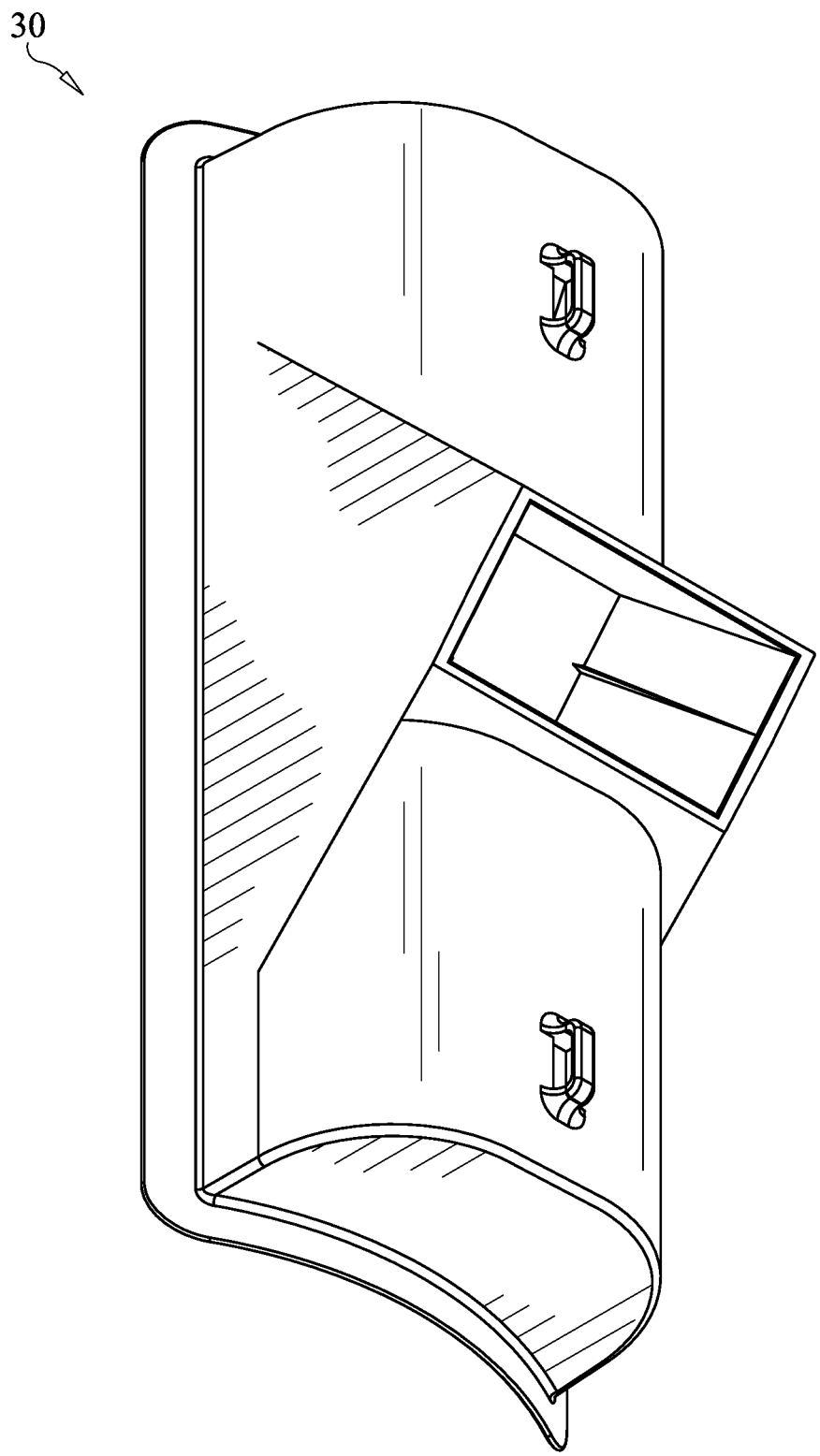
FIG. 5 depicts an alternate embodiment single piece support block.
Figure 6:
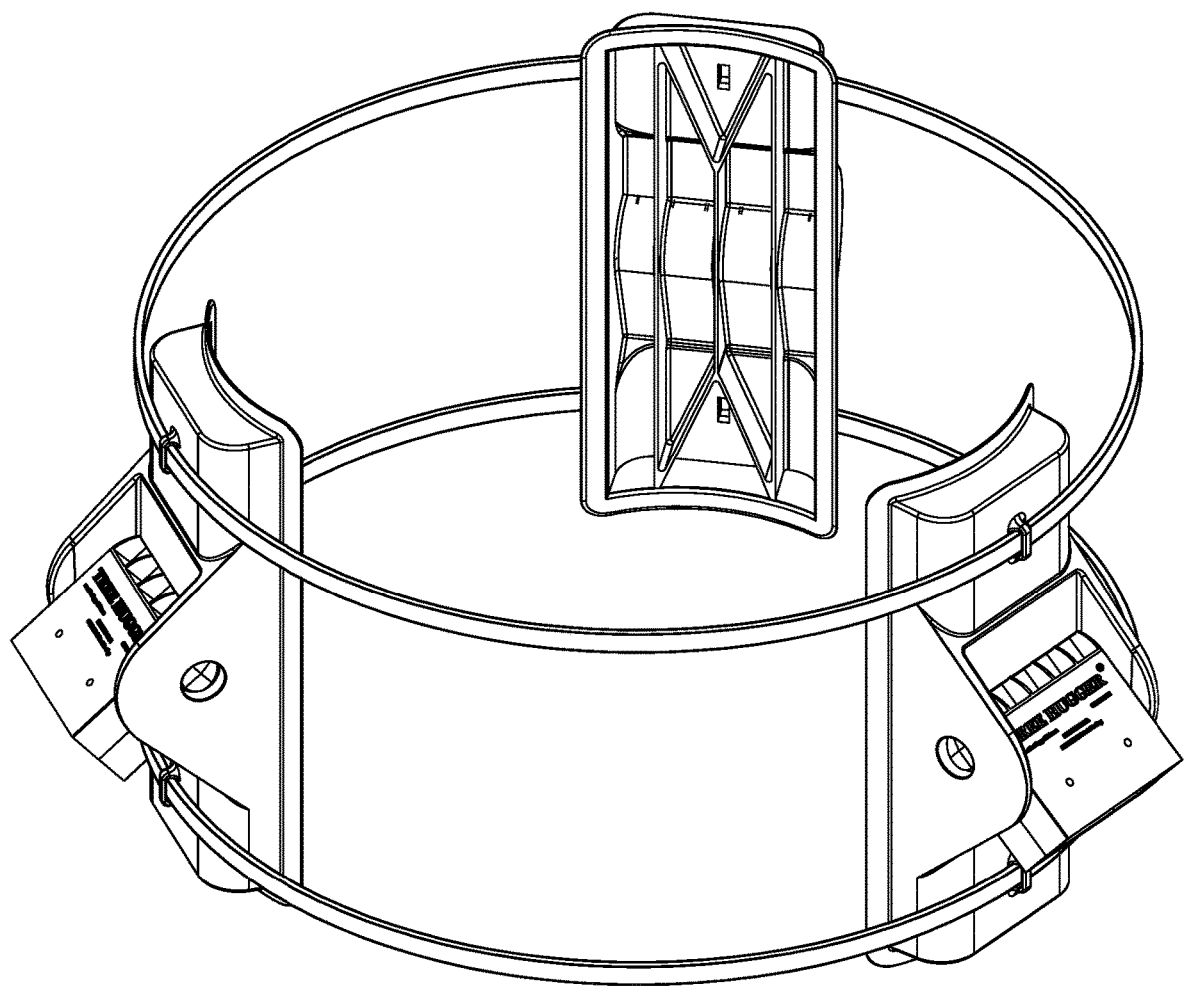
FIG. 6 depicts a plurality of tree support blocks strapped together.
Figure 7:
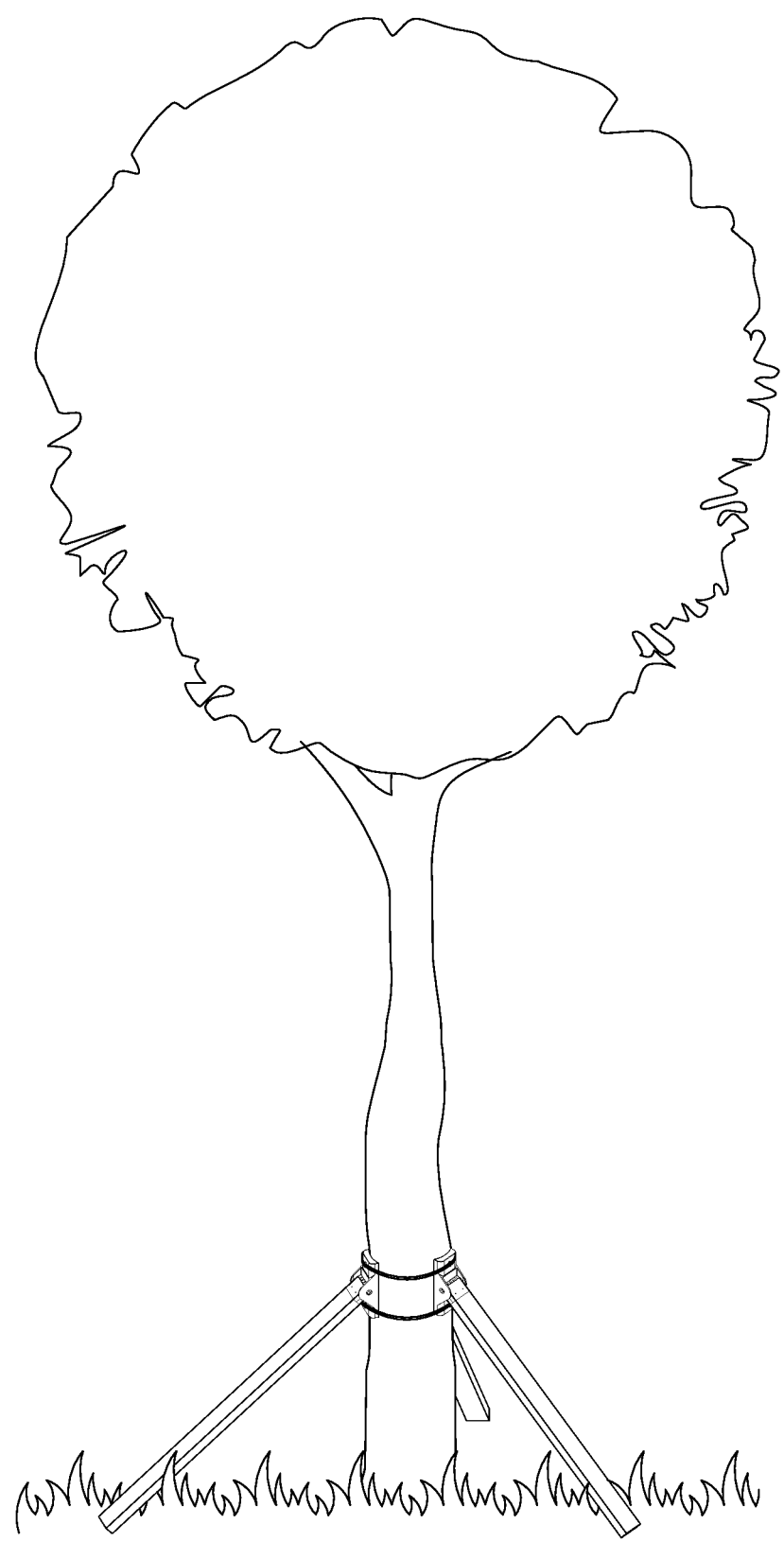
FIG. 7 depicts tree support blocks operatively installed to support a newly planted tree.

Turning now to the drawings, FIGS. 1-7 depict tree support system, generally referenced as 10, in accordance with the present invention for temporarily supporting a tree as illustrated in FIG. 7. As best seen in FIGS. 1-4, tree support system includes a support block, generally referenced as 10, which includes a base 12 and a pivotally connected support leg receiving adapter 14. As illustrated in FIGS. 6 and 7, tree support block 10 is designed to be strapped around the circumference of the trunk of a tree along with a plurality of other support blocks such that the blocks encircle the trunk in angularly spaced relation. Support block 10 functions to prop up a newly planted tree to allow time for the root system to take hold of the surrounding soil sufficiently to withstand high wind conditions. A plurality of support blocks are attached to the tree and secured by straps 15. A support leg 40 extends angularly downward from each block with the terminal end thereof engaging the ground.

As best seen in FIGS. 1-4, each support block 10 includes a rigid main body or base 20 that preferably comprises a one-piece injection molded body formed of a suitable plastic. In a preferred embodiment the support block may be colored "safety orange", or other suitable color, for high visibility. Each support block base 12 includes a front 22, a back 24, a top end 26, and a bottom end 28. In a preferred embodiment, the back 24 of support block 12 is concave so as to generally conform to the arcuate structure of the trunk of a newly planted tree. Preferably both the front 22 and back 24 define curved or arcuate shapes. At least one strap receiving loop 29 is disposed on the front 22 of base 12. A significant aspect of the present invention further involves providing the front surface 22 with rounded lateral side edges, referenced as 22a, which extend from the top end 26 to the bottom end 28 and function to cause securing straps (not shown) to bend around the front side edges 22a in an arcuate manner, thereby preventing the straps from forming a bend or crease which would lead to stress concentration at the location of the crease thereby resulting in premature strap failure.

Another significant aspect of the present invention involves providing a support block wherein the base 12 is adapted to receive a pivotally adjustable support leg receiving adapter 14. In a preferred embodiment support leg adapter 14 is capable of pivotal angular adjustment from 20-degrees to 160-degrees. A pair of projecting flanges, referenced as 23, project from the front side 22 of base 12. Each flange defines a circular opening 23a, formed therein. A support leg adapter 14 is adapted for pivotal mating coupling with flanges 23. More particularly, each adapter 14 defines a pair of laterally projecting lugs 15 which are sized for mating reception within openings 23a of flanges 23. Lugs 15 may further include a beveled surface 15a, to facilitate snap-in engagement with flanges 23. Each adapter 14 defines a cavity originating at an open end 17 which functions to receive an elongate support leg (shown in FIG. 7), such as a suitably correspondingly sized elongate piece of lumber, e.g. 2×4, 2×3, 2×2, or 4×4. FIG. 4 illustrates various adapters, referenced as 14a, 14b, and 14c, of differing size configurations in accordance with the present invention. While the various adapters 14a-14c are illustrated as having rectangular cross-sections, the present invention contemplates any suitable cross-sectional support leg configurations, including cylindrical, triangular, or any other cross-section. In a preferred embodiment, a single base 12 may be provided to accept any one of adapters 14a, 14b, or 14c. Accordingly, narrower adapters, such as adapters 14b and 14c may have lugs 15 that extend further to engage flanges 23 as seen in FIG. 4.

A further significant aspect of the present invention involves providing structural relationship between based member 12 and adapter 14 whereby support stress is transferred from the leg-receiving adapter 14 to base member 12 to avoid concentrating stresses on flanges 23 and adapter lugs 15. In accordance with this aspect of the present invention base member 12 defines a transversely disposed concave load-bearing surface, referenced as 26, and adapter 14 defines an end portion defining a corresponding convex, load-bearing surface, referenced as 19 sized for slidable mating engagement with concave surface 26. When operatively disposed, the convex load-bearing surface 19 formed on adapter 14 is in slidable engagement with the concave load-bearing surface 26 formed on base 12 thereby transferring support-related stress to base 12. As a result, support stresses imparted upon adapter 14 by the support leg connected thereto are not borne solely by adapter lugs 15, but rather are transferred to the main body 12 of the support block assembly 10.

Further, the back 24 of support block 12 may be adapted with cushion material (not shown) affixed thereto which is intended for abutting engagement with the tree. The cushion material is intended to form a protective layer between the back 24 of base 12 and the tree to prevent damage to the tree from movement between base 12 and the tree. A significant aspect of the present invention involves providing cushion material as a separate component that may be affixed to the back 24 of base 12 in the field. The cushion may further comprise a tri-fold configuration wherein a central portion is connected to the base with left and right folding panels may be laterally deployed to provide extended coverage. Providing the cushion material as a separate component piece significantly reduces manufacturing cost by eliminating the requirement of factory installation thereof. Cushion material preferably comprises cardboard, burlap, fabric, foam, or other suitable resilient material that functions as a scratch/scrape preventing buffer between the support block and the tree. In a contemplated alternate embodiment, the cushion material is biodegradable and may be coated or impregnated with a solid or liquid tree fertilizer substance.

FIG. 5 depicts an alternate embodiment support block, referenced as 30, comprising a one-piece, injection molded support block. Support block 30 differs primarily from support block assembly 10, in that block 30 comprises a unitary block structure wherein the support legs are fixed, e.g. not angularly adjustable. Other than that, the overall block structure has the same structural features as found on support block assembly 10, and more particularly main body 12 thereof.

The instant invention has been shown and described herein in what is considered to be the most practical and preferred embodiment. It is recognized, however, that departures may be made therefrom within the scope of the invention and that obvious modifications will occur to a person skilled in the art.

We claim:

1. A tree support block for use with a support leg to support newly planted trees, said support block comprising:
   a base;
   a support leg adapter pivotally coupled to said base;
   said support leg adapter defining a cavity originating at an open end thereof to receive the support leg; and
   said base defining a transversely disposed, concave load-bearing surface, and said adapter defining a convex load-bearing surface sized for slidable mating engagement with the concave surface defined on said base, whereby stress applied to said adapter is transferred to said base.

2. The tree support block according to claim 1 wherein said base includes a front surface defining rounded lateral side edges.

3. The tree support block according to claim 1 wherein said base includes a rear surface which is concave.

4. A tree support block for use with a support leg to support newly planted trees, said support block comprising:
   a base;
   said base including a front and a rear;
   said front including a surface having rounded peripheral side edges;
   said rear defining a concave shape;
   a support leg adapter pivotally coupled to said base;
   said support leg adapter defining a cavity originating at an open end thereof for receiving the support leg, and a convex load-bearing surface disposed at an opposite end thereof;
   said base defining a concave load-bearing surface; and
   said convex load-bearing surface disposed in slidable engagement with said concave load-bearing surface, whereby stress applied to said adapter is transferred to said base.

5. The tree support block according to claim 4, wherein said support leg adapter is selected from a group of support leg adapters including an adapter configured to receive a 2×2 support leg, and adapter configured to receive a 2×3 support leg, an adapter configured to receive a 2×4 support leg, and an adapter configured to receive a 4×4 support leg.

6. The support block according to claim 4 wherein pivotal coupling of said support leg adapter to said base includes a pair of flanges projecting from the front of said base, each flange defining an opening, and said adapter including a pair of laterally projecting lugs sized for mating reception within said openings, and wherein said lugs each include a beveled surface to facilitate snap-in coupling to said flanges.

* * * * *